United States Patent

Schröder et al.

Patent Number: 5,387,658
Date of Patent: Feb. 7, 1995

[54] CROSSLINKED CASTOR OIL DERIVATIVES

[75] Inventors: Wolfgang Schröder, Dorsten; Klaus Jenni, Witten, both of Germany

[73] Assignee: Huels Aktiengesellschaft, Marl, Germany

[21] Appl. No.: 115,640

[22] Filed: Sep. 3, 1993

[30] Foreign Application Priority Data

Oct. 31, 1992 [DE] Germany ............... 4236912

[51] Int. Cl.⁶ ............ C08G 59/62; C08L 63/00; C08L 91/00
[52] U.S. Cl. ............ 525/530; 525/533; 528/111.5; 528/271; 528/418; 528/295.5
[58] Field of Search ............ 525/533, 530; 528/111.5, 271, 295.5, 418

[56] References Cited

U.S. PATENT DOCUMENTS

| | | | |
|---|---|---|---|
| 2,999,824 | 9/1961 | Singleton | 525/530 |
| 3,615,303 | 10/1971 | Singer et al. | 51/295 |
| 3,878,145 | 4/1975 | Güldenpfeunnig | 525/530 |
| 4,119,592 | 10/1978 | Murphy | 525/530 |

FOREIGN PATENT DOCUMENTS

| | | |
|---|---|---|
| 199353 | 10/1986 | European Pat. Off. |
| 1804364 | 5/1970 | Germany. |
| 2732182 | 1/1978 | Germany. |
| 2106526 | 4/1983 | United Kingdom. |

OTHER PUBLICATIONS

"Concise Chemical and Technical Dictionary", H. Bennett (ed.) Chemical Publishing Co., New York, p. 260 (1947).
H. Lee and K. Neville, "Handbook of Epoxy Resins", McGraw Hill Book Co., New York, N.Y. pp. 4/44 & 4/65 (1982 Reissue).

*Primary Examiner*—John C. Bleutge
*Assistant Examiner*—D. R. Wilson
*Attorney, Agent, or Firm*—Oblon, Spivak, McClelland, Maier & Neustadt

[57] ABSTRACT

The invention relates to crosslinked castor oil derivatives which, as thickeners in liquid oils, give colorless and ageing-resistant oleogels and viscous oils even at low temperatures. The crosslinking species may be at least one of a di- or polycarboxylic acid, a olioisocyanate, and a oligoepoxide.

3 Claims, No Drawings

CROSSLINKED CASTOR OIL DERIVATIVES

FIELD OF THE INVENTION

The invention relates to crosslinked castor oil derivatives, their preparation and their use as thickeners.

DISCUSSION OF THE BACKGROUND

Gels are disperse systems comprising a colloidal solution of a liquid and a solid, having a certain dimensional stability. One function of the solid substance is to increase the viscosity of the liquid phase. For this purpose, the solid substance must be lyophilic and solvatable. Further, the solid should solvate or swell either as a micelle or as a macromolecule in the liquid phase, and the colloidal particles must form a three-dimensional network in the liquid. A large number of inorganic and organic materials have been tried for increasing the viscosity of organic liquids in such a manner.

The gel-forming action of aerosils is known (H. Bruenner, Pharm. Ind. 20 (1958), 581). According to DE 31 06 913, mixtures of finely divided silica and finely divided polyolefin fibers having a fibril structure can also be used as thickeners for organic liquids. Although these gel formers give a virtually colorless and transparent gel, the required concentration of the gel formers is very high, and the fine particles of the silica aerogels are felt on the skin, which of course is a drawback when used for cosmetic applications, among others.

Other known gel compositions contain clay minerals having a sheet structure, for example bentonites or montmorillonites of the formula $(X,Y)_{2-3}(Si,Al)_4O_{10}(OH)_2Z_{\frac{1}{3}} \cdot nH_2O$, where X is $Al^{3+}$, $Fe^{3+}$, $Mn^{3+}$ or $Cr^{3+}$, Y is $Mg^{2+}$, $Fe^{2+}$, $Mn^{2+}$, $Ni^{2+}$, $Zn^{2+}$ or $Li^+$ and Z is $K^+$, $Na^+$ or $Ca^{2+}$. Such silicates exhibit pronounced hydrophilic properties and, with absorption of large amounts of water between the lattice planes, may swell considerably or form aqueous gels having a high viscosity.

According to EP 0 204 240, gel-forming lipophilic sheet silicates can be prepared from such hydrophilic substances by exchanging interlayer cations for quaternary ammonium ions. These "organically modified" sheet silicates can, however, often be processed to a gel only in the presence of an organic solvent, which constitutes a substantial restriction. A further property of the known gel formulation is that they have a yellow to brown or green color.

Furthermore, according to DE 37 32 265, gel formers comprising aluminum magnesium hydroxy compounds having a sheet structure are also known. A specific example is the aluminum magnesium hydroxy stearate of the formula $Al_5Mg_{10}(OH)_{31}(C_{17}H_{35}COO)_4$. However, gel formation, for example with liquid paraffin, does not begin until above 100° C.

Additionally, a hydrogenated castor oil (THIXCIN R from Kronos Titan) is marketed as an oleogel former. This product has the disadvantage that gel preparation must take place at 55±1° C., and that subsequent shearing of the gel at room temperature leads to rheodestruction.

Finally, to EP 0 156 968, reaction products of partial esters of fatty acids and polyols with γ-glycidyloxy-propyltrialkoxysilanes can also be used as oleogel formers. However, these gel formers undergo subsequent crosslinking, and the gel formed becomes granular with time.

Thus, a need exists for compounds which surpass the known oleogel formers in their efficiency, do not have the stated disadvantages and possess a wide range of uses.

SUMMARY OF THE INVENTION

Accordingly, an object of the present invention is the preparation of compounds which can be used as thickeners, and which provide a virtually transparent and colorless gel.

Another object is to provide a thickener which can be readily processed to a gel without the necessity of organic solvents, and without the necessity of demanding temperature conditions. Furthermore, the gels do not contain particles which can ordinarily be perceived on the skin, and are stable with respect to shearing and with respect to time.

A further object of the invention is to provide oleogel formers principally from renewable resources, i.e. natural products.

According to the invention, the object is achieved by crosslinked castor oil derivatives. These are preferably castor oil derivatives which are crosslinked with oligoepoxides or oligoisocyanates and which, in a particular embodiment, may additionally be crosslinked with di- or polycarboxylic acids.

DESCRIPTION OF THE PREFERRED EMBODIMENTS

For the purposes of the invention, castor oil derivatives are castor oil and ricinoleic acid as well as products which can be prepared from these compounds. In particular, reaction products of castor oil, ricinoleic acid, and 12-hydroxystearic acid with di- or polyols are preferred. The castor oil derivatives are more preferably partially or completely hydrogenated. Completely hydrogenated castor oil is most preferably used.

The di- and polyols may be linear or branched, may be aliphatic or aromatic and may have further functional groups. Examples of diols are ethylene glycol or polyethylene glycol. Polyols are understood as meaning, for example, glycerol, diglycerol, triglycerol, polyglycerol, trimethylolpropane or pentaerythritol.

The compounds with which the castor oil derivatives are crosslinked are preferably compounds containing at least two functional groups, which will be understood to mean a compound containing a few hydrocarbon groups and at least two moieties which react with castor oil derivates. The hydrocarbon groups may be aliphatic, aromatic, branched or linear, and may contain groups other than carbon and hydrogen, such as nitrogen and/or oxygen.

It is to be understood that, for the purposes of the invention, crosslinked castor oil derivatives may include the case where two different castor oil derivatives are crosslinked or the case where the same castor oil derivatives are crosslinked.

The oligoepoxides with which the castor oil derivatives are crosslinked may be aliphatic or aromatic, linear or branched compounds which optionally may also have additional functional groups. The oligoepoxides preferably contain at least two epoxy groups. The oligoepoxide used may be commercial epoxides, such as, for example, ethylene glycol diglycidyl ether, propylene glycol diglycidyl ether, neopentylglycol diglycidyl ether, 1,6-hexanediol diglycidyl ether, glyceryl polyglycidyl ether, trimethylolpropane polyglycidyl ether, pentaerythritol polyglycidyl ether or sorbitol polyglycidyl ether.

Oligoisocyanates are to be understood as being aliphatic or aromatic, linear or branched compounds which optionally have further functional groups and which preferrably contain at least two isocyanate groups. Examples of these compounds are hexamethylene diisocyanate, trimethylhexamethylene diisocyanate, isophorone diisocyanate, diphenylmethane 4,4'-diisocyanate, toluylene 2,4-diisocyanate or a trimerised isophorone diisocyanate (VESTANAT® T 1890 from Huels AG).

Preferred di- or polycarboxylic acids are di-, tri-, tetra-, penta- or hexacarboxylic acids which may be linear or branched, aliphatic or aromatic and may contain further functional groups. Possible carboxylic acids are linear, aliphatic dicarboxylic acids, such as, for example, malonic acid, succinic acid, adipic acid, suberic acid, azelaic acid, sebacic acid or dodecanedioic acid. In addition to the linear dicarboxylic acids, however, branched or cyclic or aromatic dicarboxylic acids and a dicarboxylic acid having further functional groups are also possible. Examples are trimethyladipic acid, 3-tert-butyladipic acid, phthalic acid, terephthalic acid, dimeric fatty acids, tartaric acid or malic acid. Polycarboxylic acids are, for example, trimesic acid, pyromellitic acid or benzenehexacarboxylic acid, but these polycarboxylic acids too may contain further functional groups, such as, for example, citric acid.

In the preparation of the crosslinked castor oil derivatives, it is preferred that the molar ratio of castor oil derivative to total crosslinking groups be from 1:0.2 to 1:2, more preferably 1:0.5 to 1:1.6. If only a single crosslinking group is used, the preferred ratio becomes from 1:0.1 to 1:1.2, more preferably 1:0.5 to 1:1.0. The following proportions are preferred embodiments:

(a) for the reaction of castor oil derivatives with oligoepoxides, the molar ratio of the starting materials is generally 1:0.1 to 1:1.2. A-molar ratio of 1:0.3 to 1:1.1 is more preferably established, with 1:0.4 to 1:1.0 being most preferred;

(b) for the reaction of castor oil derivatives with oligoisocyanates, the molar ratio of the starting materials is usually 1:0.1 to 1:1.2. A molar ratio of 1:0.2 to 1:1.0 is more preferably established.

If the castor oil derivative is to be reacted initially with di- or polycarboxylic acids and then with oligoepoxides, the molar ratio of castor oil derivative to di- or polycarboxylic acid is preferably 1: 0.05 to 1:0.6 and the ratio of castor oil derivative to oligoepoxide is preferably 1:0.1 to 1:1.0.

If the castor oil derivative is reacted first with di- or polycarboxylic acids and then with oligoisocyanate, the molar ratio of castor oil derivative to di- or polycarboxylic acid is preferably 1: 0.05 to 1: 0.6 and the ratio of castor oil derivative to oligoisocyanate is preferably 1:0.1 to 1:1.0.

The compounds according to the invention can be prepared by reacting the aforementioned compounds with or without the use of catalysts.

Castor oil derivatives with oligoepoxides

Suitable catalysts for the reaction of castor oil derivatives with oligoepoxides are metal salts. The catalysts can be added alone or in a solvent. They may be added completely at the beginning of the reaction or a portion may be added at the beginning, with remaining portion(s) added over the course of part of the reaction time or over the entire reaction time. It is preferred that the catalyst, dissolved in a small amount of solvent, be added in portions over the entire reaction time. Examples of such catalysts are $AlCl_3$ or $SnCl_4$.

The reaction can be carried out both without a solvent and in an organic solvent, but in choosing the solvent it is necessary to ensure that it does not react with the oligoepoxide. Examples of solvents are relatively highboiling dialkyl ethers, such as ethyl butyl ether or dibutyl ether, or cyclic ethers, such as tetrahydrofuran or 1,4-dioxane. After the end of the reaction, the solvent can be removed again by conventional methods, such as, for example, vacuum distillation.

In a preferred embodiment, the reaction itself is carried out without a solvent but the catalyst is added in solution in a solvent.

The temperature range for the reaction with the oligoepoxides is in general 50° to 150° C. A temperature of 80° to 130° C. is preferably established.

The molar ratio of epoxy groups to catalyst is preferably 1:0.001 to 1:0.2. In a more preferred embodiment, the epoxide/catalyst ratio is 1:0.005 to 1:0.05.

The reaction time is preferably 0.5 to 10 hours, depending on the batch size.

Castor oil derivatives with carboxylic acids

Suitable catalysts for the reaction of the castor oil derivatives with di- or polycarboxylic acids are conventional esterification catalysts. The catalyst may be added by itself or in solution in an organic solvent. Examples of such catalysts are titanates, such as, for example, tetrabutyl titanate or tetrapropyl titanate. However, it is also possible to use acidic ion exchangers which can be removed again after the end of the reaction by conventional methods, such as, for example, filtration.

The reaction can be carried out both without a solvent and in an organic solvent. After the end of the reaction, the solvent can be removed again by the conventional methods, such as distillation or vacuum distillation. The reaction is preferably carried out without a solvent.

The temperature range for the reaction of the castor oil derivatives with the di- or polycarboxylic acids is preferably 50° to 250° C. A temperature of 80° to 240° C. is more preferably established.

The reaction can be carried out at atmospheric pressure or reduced pressure. The pressure is preferably reduced from 1,000 hPa to 100 hPa during the reaction.

The molar ratio of acid groups to catalyst is preferably 1:0.2 to 1:0.0005. In a more preferred embodiment, the ratio of acid groups to catalyst is 1:0.01 to 1:0.001.

The catalyst can be added completely at the beginning of the reaction or is added in portions over part of the reaction time or over all of the reaction time. In a preferred embodiment, the catalyst is added completely at the beginning.

The reaction time is preferably 0.5 to 10 hours, depending on the batch size.

Castor oil derivatives with oligoisocyanates

The reaction of the castor oil derivatives with the oligoisocyanates can be carried out using known catalysts. In a preferred embodiment, the reaction is carried out without catalysts.

The reaction can be carried out either without a solvent or in an organic solvent, or a solvent may be added during the reaction. After the end of the reaction, the solvent can be removed again by the conventional methods, such as distillation or vacuum distillation.

In a preferred embodiment, the reaction is carried out without a solvent.

The preferred temperature range for the reaction with the oligocyanates is 50° to 250° C. A temperature of 80° to 200° C. is more preferably established. In a particularly preferred embodiment, the temperature is increased during the reaction.

The compounds according to the invention are suitable as emulsifiers and thickeners, and they may be used in particular for the preparation of oleogels and viscous oils from liquid oils. The products are particularly useful in lubricants, cosmetics and food, in which case the emulsifiers, thickeners, oleogels and viscous oils are incorporated therein by methods per se known.

For the purposes of the invention, the term "oil" means an oil other than castor oil and the aforementioned castor oil derivatives. Preferred oils which can be gelled by the compounds according to the invention are liquid, synthetic and natural oils, such as, for example, liquid paraffin, MCT oils, propylene glycol caprylate/caproate, oleyl erucate, decyl oleate, IPM, IPP, sesame oil, peanut oil, avocado oil, almond oil, sunflower oil, wheatgerm oil and jojoba oil.

The amount of the compounds according to the invention which are used for gelling the oils is dependent on the polarity of the oils used and on the degree of crosslinking of the compounds. The weaker the polarity of the oils and the lower the degree of crosslinking of the inventive compounds, the higher is the required amount of the inventive compounds. In general, 0.1 to 30% by weight, more preferably 2 to 15% by weight, of crosslinked castor oil derivatives are added, relative to the oil to be gelled.

In order to achieve a uniform distribution of the compounds according to the invention in the oil phase in the gel preparation process, such compounds are preferably milled to a particle size of <500 μm before being introduced into the oil phase.

The crosslinked castor oil derivatives can be very readily used as dispersants, or rheological additives. The crosslinked castor oil derivatives can be processed at as low as 30° C. and give viscous oils and gels which are colorless, resistant to ageing and heat-stable up to 60° C. The compounds also have the advantage that they are prepared predominantly with the renewable raw materials, i.e. natural products.

In carrying out the gel preparation in practice, the products according to the invention are preferably sheared at temperatures of 30° to 100° C., more preferably 40° to 60° C., for a period of preferably 2 to 20 minutes, more preferably 8 to 12 minutes, with the oil to be gelled, which may be effected in an homogenizer, such as the Ultra-Turrax. The rotary speed of the homogenizer may be 1,000 to 25,000 rpm.

In the case where the inventive compounds cannot be milled, owing to their plasticity, prior melting and introduction of the hot liquids thus obtained into the oil phase thermostated at the temperature of formation of the oleogel are required.

When the thickeners are used as oleogel formers, care must be taken in selecting the proper temperature of formation. In some cases only viscous oils are obtained when the temperature is too high, while at too low a temperature, in some cases, the oleogel former does not dissolve homogeneously in the oil phase, so that particles of oleogel formers are still detectable when the prepared gel is rubbed into the skin.

In the case of certain oleogels, in particular those which are obtained at low temperatures, it is found, surprisingly, that subsequent heat treatment solidifies the gels. The heat treatment can be carried out, for example, in such a way that the oleogels are stored for 3 hours at just below their liquefaction temperature in an oven or in a thermostat.

Similarly to the oleogels, it is also possible to use the thickeners according to the invention to prepare viscous oils, which generally have a viscosity of 1,000 to 25,000 mPas. The amount of thickener should be at least 2% less than the amount of thickener which is just sufficient for obtaining an oleogel, or the temperature used in the preparation should exceed the temperature which is just sufficient for the formation of an oleogel by at least 10° C. The amount which is just sufficient and the temperature which is just sufficient may be readily determined by the ordinary artisan in view of the teaching in the present disclosure.

The examples which follow show that a content of 6% is sufficient for producing a solid gel, when a relatively highly crosslinked castor oil derivative (such as a reaction product of hydrogenated castor oil with sorbitol polyglycidyl ether) is used.

In the case of more weakly crosslinked products, however, at least 8% preferably 10% of the thickener must be used. At concentrations of 10% or more, stable oleogels can be obtained with certain types of thickeners even at preparation temperatures of 20° C. or higher, provided that the thickener dissolves in the oil at the temperature.

Having generally described the invention, a further understanding can be obtained by the reference to certain specific examples which are provided herein for purposes of illustration only and are not intended to be limiting unless otherwise specified.

EXAMPLE 1

100 g of hydrogenated castor oil are stirred with 11.1 g of ethylene glycol diglycidyl ether for 8 hours at 120° C., with 0.5 g of AlCl$_3$ dissolved in 1.67 g of ethyl butyl ether added every 2 hours. At the completion of the reaction, the epoxide content is below the detection limit of 0.01%.

EXAMPLE 2

900 g of hydrogenated castor oil are stirred with 166.9 g of ethylene glycol diglycidyl ether for 8 hours at 120° C., with 4.5 g of AlCl$_3$ dissolved in 15 g of ethyl butyl ether added every 2 hours. To remove the ethyl butyl ether, the reaction mixture is then stirred for 2 hours at 150° C. and 500 hPa. When the reaction is complete, the epoxide content is below the detection limit of 0.01%.

EXAMPLE 3

650 g of hydrogenated castor oil are stirred with 59.9 g of neopentylglycol diglycidyl ether for 8 hours at 130° C., with 3.25 g of AlCl$_3$ dissolved in 11 g of ethyl butyl ether being added every 2 hours. To remove the ethyl butyl ether, the reaction mixture is then stirred for 2 hours at 150° C. and 500 hPa.

EXAMPLE 4

650 g of hydrogenated castor oil are stirred with 63.7 g of 1,6-hexanediol diglycidyl ether for 8 hours at 120°

C., with 3.25 g of AlCl₃ dissolved in 11 g of ethyl butyl ether being added every 2 hours. To remove the ethyl butyl ether, the reaction mixture is then stirred for 2 hours at 150° C. and 500 hPa.

EXAMPLE 5

650 g of hydrogenated castor oil are stirred with 281.2 g of sorbitol polyglycidyl ether for 8 hours at 120° C., with 3.25 g of AlCl₃ dissolved in 11 g of ethyl butyl ether being added every 2 hours. To remove the ethyl butyl ether, the reaction mixture is then stirred for 2 hours at 150° C. and 500 hPa.

EXAMPLE 6

5.4 g of hexamethylene diisocyanate are added to 100.6 g of hydrogenated castor oil at 90° C. in the course of a few minutes. The reaction mixture is stirred for a further 2 hours at 100° C. The conversion is complete. According to infrared spectroscopy, free isocyanate groups can no longer be detected (detection limit: 0.005%).

EXAMPLE 7

14.27 g of isophorone diisocyanate are added to 100.6 g of hydrogenated castor oil at 90° C. in the course of a few minutes. The reaction mixture is stirred for a further 2 hours at 100° C. and then for 2 hours at 150° C. The conversion is complete. According to infrared spectroscopy, free isocyanate groups can no longer be detected.

EXAMPLE 8

6.75 g of trimethylhexamethylene diisocyanate are added to 100.6 g of hydrogenated castor oil at 100° C. in the course of a few minutes. The reaction mixture is stirred for a further 2 hours at 100° C. and then for 2 hours at 200° C.

EXAMPLE 9

100 g of ethylene glycol bis-(12-hydroxystearate), prepared from ethylene glycol and 12-hydroxystearic acid, are stirred with 27.8 g of ethylene glycol diglycidyl ether for 8 hours at 120° C. with 0 5 g of AlCl₃ dissolved in 1.67 g of ethyl butyl ether being added every 2 hours. To remove the ether, the reaction mixture is then stirred for 2 hours at 150° C. and 500 hPa.

EXAMPLE 10

100 g of trimethylolpropane tris-(12-hydroxystearate), prepared from trimethylolpropane and 12-hydroxystearic acid, are stirred with 23.0 g of hexanediol diglycidyl ether for 8 hours at 120° C. with 0.5 g of AlCl₃ dissolved in 18 g of ethyl butyl ether being added every 2 hours. To remove the ethyl butyl ether, the reaction mixture is then stirred for 2 hours at 150° C. and 500 hPa.

EXAMPLE 11

100 g of pentaerythrityl tetrakis-(12-hydroxystearate), prepared from pentaerythritol and 12-hydroxystearic acid, are stirred with 9.8 g of neopentylglycol diglycidyl ether for 4 hours at 130° C., with 0.5 g of AlCl₃ dissolved in 1.6 g of ethyl butyl ether being added every hour. To remove the ethyl butyl ether, the reaction mixture is then stirred for 2 hours at 150° C. and 300 hPa.

EXAMPLE A 1

200 mg of a medium-chain triglyceride (MIGLYOL 812 from Huels AG) are heated to 60° C. in a beaker. 12 mg of hydrogenated castor oil crosslinked with sorbitol polyglycidyl ether (molar ratio 0.6:1), which is previously milled to a particle size of <500 μm in a micromill, are added and shearing is carried out for 10 minutes with the Ultra-Turrax at 24,000 rpm. Cooling is then carried out and the micropenetration according to Klein is measured (cf. Table 1).

EXAMPLES A 2 to A 4

The procedure is as in Example A 1. However, 16, 20, and 24 mg, respectively, of hydrogenated castor oil crosslinked with sorbitol polyglycidyl ether are added to each beaker.

EXAMPLE B 1

200 mg of oleyl erucate (DYNACERIN 660 from Huels AG) are heated to 40° C. in a beaker. 24 mg of hydrogenated castor oil crosslinked with sorbitol polyglycidyl ether (molar ratio 1:1), which is previously milled in a micromill to a particle size of <500 μm, are added and shearing is carried out for 10 minutes with the Ultra-Turrax at 24,000 rpm. Cooling is then carried out and the micropenetration according to Klein is measured (cf. Table 1).

EXAMPLES B 2 to B 4

The procedure is as in Example B 1. However, the reaction is carried out at 50°, 60°, and 70° C., respectively.

EXAMPLE C 1

200 mg of liquid paraffin are heated to 30° C. in a beaker. 24 mg of hydrogenated castor oil crosslinked with ethylene glycol diglycidyl ether (molar ratio 1:1), which is previously milled in a micromill to a particle size of <500 μm, are added and shearing is carried out for 10 minutes with the Ultra-Turrax at 24,000 rpm. Cooling is then carried out and the micropenetration according to Klein is measured (cf. Table 1).

EXAMPLES C 2 to C 4

The procedure is as in Example C 1. However, the oleogels are prepared at 40°, 50°, and 60° C., respectively.

EXAMPLE D 1

200 mg of a medium-chain triglyceride (MIGLYOL 812) are heated to 50° C. in a beaker. 24 mg of hydrogenated castor oil crosslinked with 1,6-hexanediol diglycidyl ether (molar ratio 1:1) are melted at about 140° C. and added while hot to the heated oil, after which the mixture is sheared for 10 minutes with the Ultra-Turrax at 24,000 rpm. Cooling is then carried out and the micropenetration according to Klein is measured (cf. Table 1).

EXAMPLES D 2 to D 5

The oleogel obtained in Example D 1 is stored for 3 hours at 30°, 40°, 50°, and 60° C. respectively After cooling, the micropenetration is measured again. No change is found.

EXAMPLE E 1

200 mg of a medium-chain triglyceride (MIGLYOL 812) are heated to 30° C. in a beaker. 24 mg of hydrogenated castor oil crosslinked with ethylene glycol diglycidyl ether (molar ratio 1:1) are melted at about 140° C. and added while hot to the heated oil, after which the mixture is sheared for 10 minutes with the Ultra-Turrax at 24,000 rpm. Cooling is then carried out and the micropenetration according to Klein is measured (cf. Table 1).

EXAMPLES E 2 to E 5

The oleogel obtained in Example 1 is stored for 3 hours at 30°, 40°, 50°, and 60° C. respectively After cooling, the micro-penetration is measured again. The gel stability improves linearly with increasing storage temperature. At 70° C., the gel melts.

TABLE 1

| | Klein micropenetration values of various exemplary oleogels | | | | |
|---|---|---|---|---|---|
| Example | 1 | 2 | 3 | 4 | 5 |
| A | 242 | 209 | 180 | 162 | — |
| B | 411 | 489 | 710 | 909 | — |
| C | 1,512 | 396 | 402 | 348 | — |
| D | 453 | 420 | 495 | 405 | 471 |
| E | 540 | 423 | 393 | 306 | 241 |

We claim:

1. A composition suitable for thickening or gelling an oleaginous substance prepared by reacting a mixture comprising: (A) a linking agent containing at least two epoxide groups; (B) a member of the group consisting of castor oil, esters of ricinoleic acid or 12-hydroxystearic acid with a di- or polyol, and hydrogenated derivatives thereof; wherein the molar ratio of (A) to (B) is 0.1:1 to 1.2:1; and isolating a reaction product of (A) and (B) that is substantially free of epoxide groups.

2. The composition according to claim 1, wherein component (B) is partially or completely hydrogenated castor oil.

3. The composition of claim 1, wherein the molar ratio of (A) to (B) is 0.4:1 to 1.0:1.

* * * * *